(12) United States Patent
Piepers

(10) Patent No.: US 7,061,548 B2
(45) Date of Patent: Jun. 13, 2006

(54) FILTER DEVICE

(75) Inventor: Dirk Piepers, Bruges (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 574 days.

(21) Appl. No.: 10/116,576

(22) Filed: Apr. 4, 2002

(65) Prior Publication Data

US 2002/0171767 A1 Nov. 21, 2002

(30) Foreign Application Priority Data

Apr. 9, 2001 (EP) .................................. 01201303

(51) Int. Cl.
*H04N 5/21* (2006.01)
*H04N 9/78* (2006.01)

(52) U.S. Cl. ...................... 348/624; 348/607; 348/620; 348/670

(58) Field of Classification Search ................ 348/630, 348/663–670, 607, 609, 620, 624, 701; H04N 5/21, H04N 9/78
See application file for complete search history.

(56) References Cited

U.S. PATENT DOCUMENTS 5,990,978 A 11/1999 Kim et al. .................. 348/663

FOREIGN PATENT DOCUMENTS

| JP | 2-29188 A | | 1/1990 |
|----|-----------|----|--------|
| JP | 4-222174  | *  | 8/1992 |
| JP | 4-222174 A | | 8/1992 |
| JP | 6-189335 A | | 7/1994 |
| JP | 07075125 A | | 3/1995 |

* cited by examiner

*Primary Examiner*—Sherrie Hsia
(74) *Attorney, Agent, or Firm*—Edward W. Goodman

(57) ABSTRACT

A filter device (1) includes a main filter unit (10), such as a 2-D comb filter, implemented in hardware, with an input for receiving a video signal (Φ) and an output for providing a filtered video signal (Φ1), a controllable temporal noise reduction unit (20) receiving the filtered video signal (Φ1) from the main filter unit (10), to perform a noise reduction operation on the filtered video signal (Φ1), and a unit (14, 30, 40) for detecting a very low amount of motion in a video image of the filtered video signal (Φ1) and for controlling the controllable temporal noise reduction unit (20) on the basis of the detected very low amount of motion, so as to enable the filter device (1) to reduce cross-luminance and/or cross-color as well when only a very low amount of motion is present in the signal.

11 Claims, 2 Drawing Sheets

FILTER DEVICE

BACKGROUND OF THE INVENTION

1. Field of the Invention

The present invention relates, in general, to the art of filtering of a video signal in order to eliminate cross-effects.

2. Description of the Related Art

As is commonly known, a composite video signal comprises color information and luminance information. When a video signal is received by, for instance, a color television tuner, the luminance signal (Y) and the chrominance signals (U, V) need to be separated. For instance, in a PAL video signal, the video signal has a bandwidth of approximately 5 MHz, wherein the carrier of the color signal is located at about 4.43 MHz. In order to obtain the luminance signal Y, a band suppression filter is needed which suppresses the color carrier. On the other hand, in order to obtain the color signals U, V, a band-pass filter is needed which passes the color carrier and suppresses all other frequencies.

In practice, a 100% separation between the luminance signal Y and the color signals U, V cannot be achieved. After decoding, the luminance signal Y will be affected to some extent by the color signal, while the color signals U, V will in some extent be affected by the luminance signal. These two effects are indicated as cross-luminance effect and cross-color effect, respectively, or generally as cross-effects.

These cross-effects are visible in the video image as displayed on a TV-screen. For instance, in high frequency black/white patterns (stripe patterns), rainbow effects can be seen. On the other hand, at an intersection between two adjacent image parts of different colors, a black/white block pattern can be seen. Both of these effects (rainbow effect and block pattern) are not stationary, but move due to the 25 Hz offset of the video signal.

In order to eliminate, or at least reduce, these cross-effects, it is already known to use a 2-D comb filter or a 3-D comb filter.

A 2-D comb filter (two-dimensional) is operative on image information in two directions, i.e., horizontal and vertical. A disadvantage of 2-D comb filters is that they allow diagonal artifacts.

A 3-D comb filter (three-dimensional) compares information in two spatial dimensions, i.e., horizontal and vertical, and also in a temporal dimension. In other words, a 3-D comb filter determines changes with time. A 3-D comb filter can eliminate the problem of the diagonal artifacts known from 2-D comb filters. However, in order to be able to determine changes with time, a 3-D comb filter needs three field memories, which are relatively expensive. Further, the 3-D comb filter action can only be performed with respect to stationary parts of the image; if the image comprises moving parts, the filter behaves as a 2-D filter. The switching from 3-D operation to 2-D operation whenever a part of the image starts to move, and vice versa, is undesired.

SUMMARY OF THE INVENTION

The main object of the present invention is to provide a 3-D comb filter of which the costs are significantly reduced as compared to currently available 3-D comb filters, while, further, the performance of such a 3-D comb filter is comparable or even improved as compared to currently available 3-D comb filters.

According to a preferred embodiment of the present invention, a filter device comprises a hardware component, such as, for instance, a standard 2-D comb filter, followed by a software component which decides whether or not additional filter steps need to be taken. If the software decides that further filter steps are not taken, then the filter device as a whole behaves as the hardware component, i.e., as a 2-D comb filter.

Implementing part of the filter device in software involves the important advantage that the filter device as a whole can easily be modified and is cheaper to develop. Furthermore, implementing part of the filter device in software instead of hardware reduces the space needed for circuitry and reduces the energy consumed by circuitry.

According to a further embodiment of the present invention, a controllable noise reduction component is controlled on the basis of information received from a motion detector. Usually, such a controllable noise reduction component and a motion detector are already present in a television apparatus. As such, all that is needed is a suitably programmed module receiving the information from the motion detector and generating a suitable control signal for the noise reduction module.

BRIEF DESCRIPTION OF THE DRAWINGS

These and other aspects, characteristics and advantages of the present invention will be further clarified by the following description of a preferred embodiment of a filter device in accordance with the invention, with reference to the drawings, in which same reference numerals indicate equal or similar parts, and in which.

DESCRIPTION OF THE PREFERRED EMBODIMENTS

Figure 1:
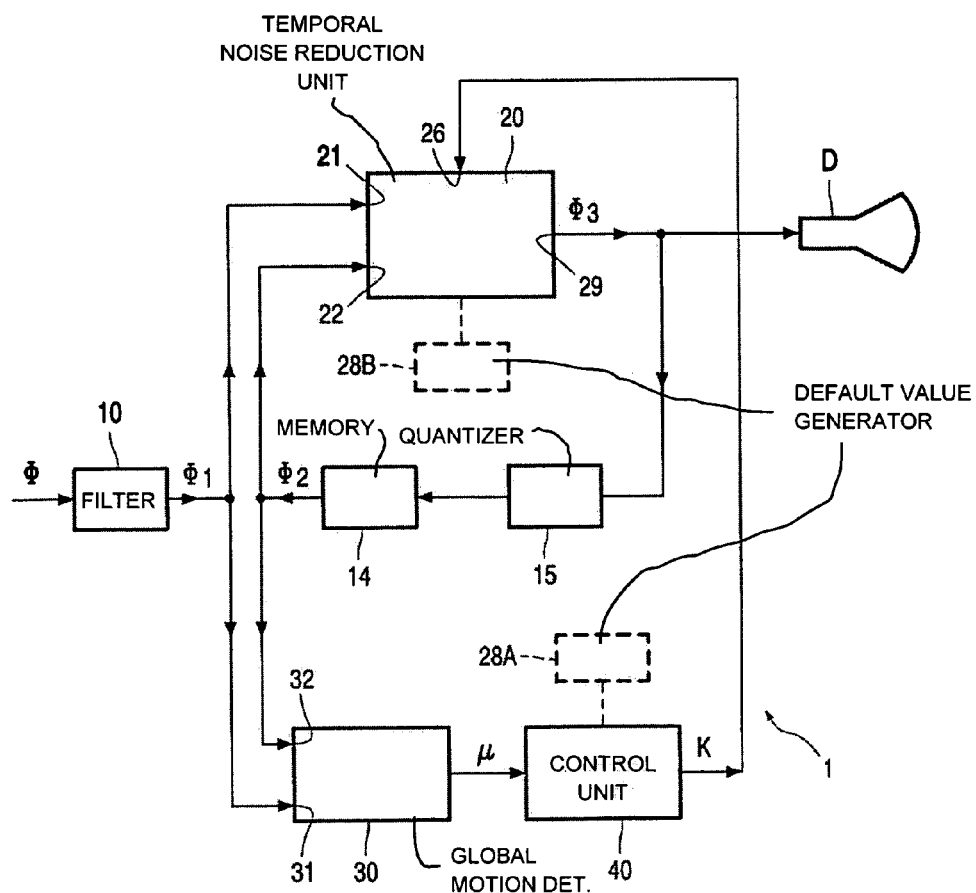
FIG. 1 schematically shows a block diagram of an embodiment of an image display apparatus comprising a filter device in accordance with the present invention.

FIG. 1 schematically shows a block diagram of a filter device 1 in accordance with the present invention. Basically, the filter device 1 comprises a global motion detector 30 and a controllable noise reduction unit 20, and a control unit 40 for controlling the controllable noise reduction unit 20 on the basis of an amount of motion as detected by the global motion detector 30.

Generally, the global motion detector 30 and the controllable noise reduction unit 20 receive a video signal $\Phi 1$. The controllable noise reduction unit 20 operates on its input signal $\Phi 1$ to generate an output signal $\Phi 3$ with reduced noise. The global motion detector 30 detects the amount of motion in the input signal $\Phi 1$. Based on this amount of motion, the control unit 40 adapts the operation of the controllable noise reduction unit 20. Although the control unit 40 might be implemented in hardware, it is preferred for the control unit 40 to be implemented in software.

The present invention is already applicable if the video signal $\Phi 1$ is a "normal" video signal. However, the filter device 1 preferably also comprises a hardware filter unit 10 coupled before the global motion detector 30 and the controllable noise reduction unit 20, this hardware filter unit 10 performing an initial filtering operation. The "normal" video signal $\Phi$, representing both the luminance and chrominance components of the video signal, is now received by the hardware filter unit 10, which provides, as an output signal, said video signal Φ1 as filtered video signal. Preferably, but not necessarily, the hardware filter unit 10 may be a standard 2-D comb filter. In view of the fact that such comb filters are commonly known, the hardware filter unit 10 will not be described in more detail here. An advantage of the hardware 2-D comb filter 10 is that it sharpens frequencies around the color subcarrier frequency, thereby increasing the quality of the overall filtering operation.

Figure 2:
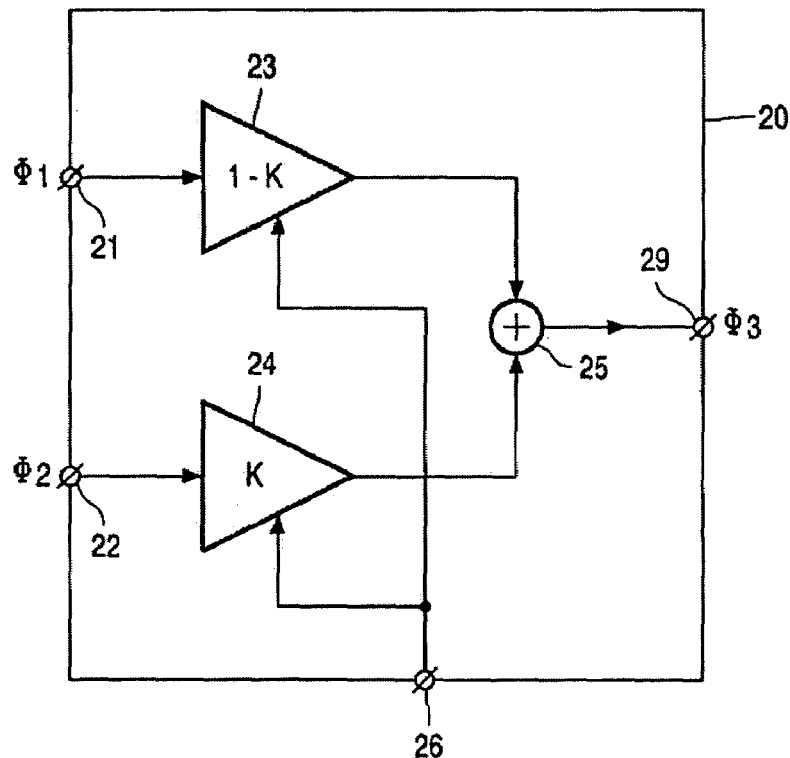
FIG. 2 schematically shows a block diagram of an embodiment of a controllable temporal noise reduction unit.

FIG. 2 schematically shows a block diagram of an embodiment of a controllable temporal noise reduction unit 20. The controllable temporal noise reduction unit 20 comprises a first input 21 for receiving the output signal Φ1 from the hardware filter unit 10, and a second input 22 for receiving the video signal of a previous field, indicated as Φ2. Noise reduction unit 20 is arranged to calculate, on a pixel by pixel base, an output signal Φ3 as a combination of the input signal Φ1 and the previous output signal Φ2. More particularly, for each pixel, the output value Φ3 is calculated as Φ3=K·Φ2+(1−K)·Φ1. In FIG. 2, this is schematically shown as a first amplifier 23 having a gain 1−K receiving the input signal Φ1 from the first input 21, and a second amplifier 24 having a gain K receiving the signal Φ2 at the second input 22, and an adder 25 receiving the output signals of such amplifiers. The thus constructed output signal Φ3 is provided at an output 29 of the noise reduction unit 20. For use when filtering the subsequent field, the output signal Φ3 is also fed to a field memory or frame memory 14, if desired via a quantizer 15. The field or frame memory 14 provides the previous video signal Φ2.

The parameter K is a noise reduction parameter. The noise reduction parameter K can have any value from 0 to 1. If K=0, no filtering is performed. If K=1, the output video signal Φ3 would be a frozen picture of what has been captured before in the memory 14. To avoid this freeze, in a preferred embodiment, K is maximally 0.75.

The temporal noise reduction unit 20 is controllable, according to the invention, in that the value of the noise reduction parameter K (and hence, the value of 1−K) can be controlled by an input control signal, received at a control input 26, as will be explained hereinafter. In the following discussion, it will be assumed that the control signal is equal to K. However, as an alternative, it is also possible that the temporal noise reduction unit 20 comprises a default setting for the value of the noise reduction parameter K, in which case, the control signal may constitute an amendment to such a default setting.

The global motion detector 30 has two inputs 31 and 32, receiving the filtered video signal Φ1 from the hardware filter unit 10 and the previous video signal Φ2 from the video memory 14, respectively.

Figure 3:
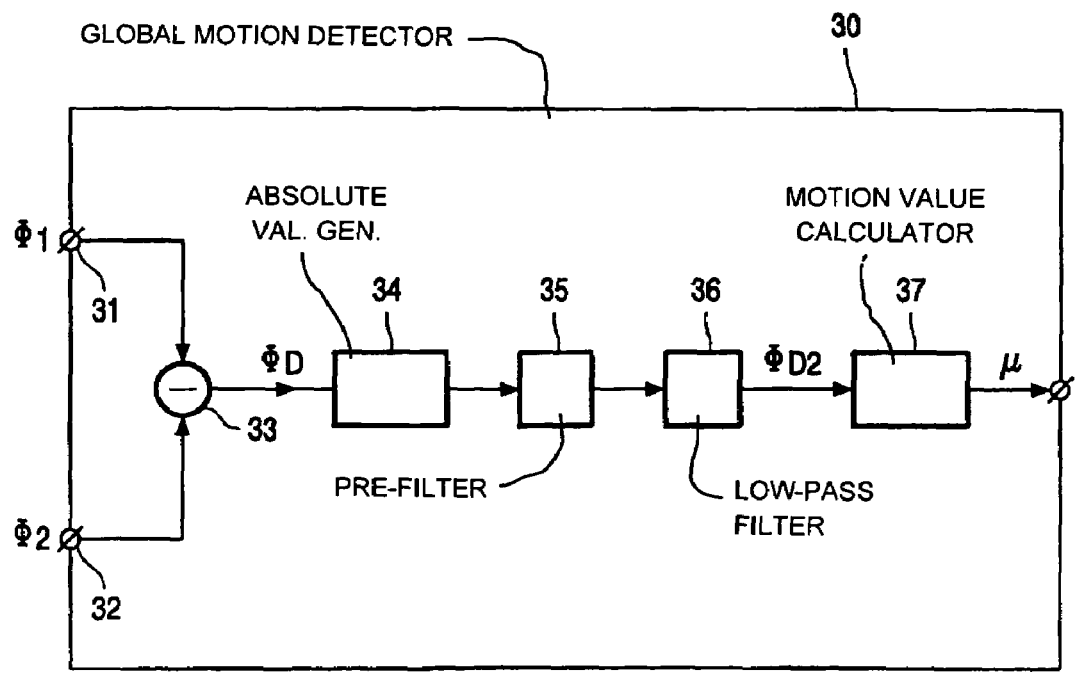
FIG. 3 schematically shows a functional block diagram of an embodiment of a global motion detector.

FIG. 3 schematically shows a functional block diagram of the global motion detector 30. The two input signals Φ1 and Φ2 are subtracted by a difference detector 33. This difference detector 33 provides a difference signal ΦD that is fed to a low-pass filter 36. The function of the low-pass filter 36 is to make the motion detector 30 itself less sensitive to noise.

The motion detector 30 may comprise a pre-filter 34, arranged for attenuating the video signal at frequencies around the color subcarrier, so that cross-luminance residues are not falsely detected as motion.

The motion detector 30 may also comprise an absolute value generator 35 connected before the input of the low-pass filter 36.

Based on the filtered difference signal ΦD2 as outputted by the low-pass filter 36, a motion value μ is calculated by a motion value calculator 37. The motion value calculator 37 calculates the motion value μ on the basis of a fixed relationship between an amount of motion, on the one hand, and an adequate motion value, on the other hand, this relationship being predetermined by a manufacturer and being provided in the motion value calculator in the form of a look-up table or a look-up curve, or in the form of a formula. The exact contents of the look-up table, or the exact shape of the look-up curve, or the exact formulation of such a formula, respectively, is not essential to the present invention, and a skilled person may implement any suitable relationship as desired. In general, however, such relationship is chosen such that an increase in the amount of motion corresponds to an increase in the motion value μ.

Such look-up table or look-up curve or formula is stored in a memory associated with the motion value calculator 37, such memory not being shown specifically in the FIG. 3.

The motion value μ (e.g., a value between 0 and 255 in an 8-bit representation) is outputted by the global motion detector 30 and received by the control unit 40 which uses the motion value μ received from the global motion detector 30 to determine a suitable control signal for the controllable temporal noise reduction noise unit 20. In the present example, this means that the control unit 40 calculates a value for K on the basis of the motion value μ.

Normally, K will be a continuously variable parameter. In a possible embodiment, the control unit 40 may be arranged to calculate K over the full range from 0 to 1 on the basis of a fixed predetermined relationship between μ and K according to a formula of type K=f(μ).

However, alternatively, it is also possible that the controllable temporal noise reduction noise unit 20 is associated with a default value generator which generates a default value Kd. In FIG. 1, a default value generator 28A is shown in dotted lines, an output thereof being coupled to the control unit 40 so that the control unit 40 receives the default value Kd. In that case, the control unit 40 may be arranged to calculate a modification factor Km on the basis of a fixed predetermined relationship between μ and Km according to a formula of type Km=f(μ), to generate the value K according to the formula K=Kd+Km, and to provide the value K to the control input 26 of the controllable temporal noise reduction noise unit 20. As a further alternative, a default value generator 28B (also shown in dotted lines in FIG. 1) may be associated with the controllable temporal noise reduction noise unit 20 only, so that the control unit 40 does not receive the default value Kd. In that case, the control unit 40 may be arranged, again, to calculate the modification factor Km as above, according to a formula of type Km=f(μ), and to provide the modification factor Km to the control input 26 of the controllable temporal noise reduction noise unit 20. In that case, the controllable temporal noise reduction noise unit 20 will be designed for calculating K=Kd+Km.

Herein, Kd indicates a value that is suitable for noise reduction. Kd may depend on a customer's wishes as to noise reduction, on an amount of motion, on a measured amount of noise, and/or on a measured amount of sharpness. In accordance with the principles of the present invention, for very low amounts of motion, K is increased by a fixed or variable amount Km to allow the filter to do more than just noise reduction, viz. to reduce cross-luminance and/or cross-color as well.

The modification factor Km as defined may be continuously variable within a suitable range. However, it is also possible that Km equals zero for values of μ above a low predetermined threshold $\mu_{TH}$, while Km equals a predetermined fixed value κ if m falls below the threshold $\mu_{TH}$, according to the formula:

$$\mu > \mu_{TH} \Rightarrow Km=0;\ \mu < \mu_{TH} \Rightarrow Km=\kappa$$

Alternatively, if μ falls below the predetermined threshold $\mu_{TH}$, the noise reduction factor K is increased by 25% (a value of, e.g., K=0.6 for motion μ just above the threshold $\mu_{TH}$ is increased to a value K=0.75 for motion μ below the threshold $\mu_{TH}$).

The value Km=0 corresponds to a situation where an image or a part of an image is not stationary, i.e., it contains motion above the threshold $\mu_{TH}$. However, it may happen, in practice, that the image still contains a little motion while, nonetheless, the value of μ itself is so low as to suggest a stationary image. If μ is a value between 0 and 255 in an 8-bit representation with μ=0 indicating no motion, for a preferred embodiment, it holds that $\mu_{TH}$=12, i.e., about 5% of the μ's maximum value 255. It may be that the control unit 40 always makes Km equal to immediately κ (or the additional 25% of the original value of K) when the value of μ itself becomes so low as to suggest a stationary image, for instance, when μ passes the predetermined threshold $\mu_{TH}$ in a downwards direction, i.e., μ drops below the threshold. However, in such circumstances, undesired effects may occur. Therefore, as an alternative, it may be desirable that the control unit 40 is arranged to take into account a certain "waiting time" when deciding that an image or a part of an image is stationary. This means, in the above example, that the control unit 40 is associated with a timer, that the control unit 40 is adapted to start said timer whenever μ drops below the threshold and to stop and reset said timer whenever μ rises above the threshold, and that the control unit 40 is adapted to make Km equal to zero only in the event that said timer reaches a predetermined value.

On the other hand, it may be that the control unit 40 can, in another way, obtain certainty regarding the fact whether or not the image is stationary. For instance, when the video signal is coming from a photo CD player, or another device generating still images, the above-mentioned waiting time is not necessary. Therefore, the control unit 40 is preferably associated with a detector (not shown) detecting the source of the input video signal Φ, and to avoid such waiting time if said detector detects a video source generating still images. In one example, the normal waiting time is 20 seconds, while the waiting time is only 6 seconds for DVD or CDI images. In another example, after each 5 seconds, the noise reduction factor K is increased by 10%. Shorter waiting times can be used when better motion detectors are available. As soon as motion is detected, the additional noise reduction (i.e., the amount Km that was added to obtain a comb filtering in addition to the normal noise reduction) is taken away immediately.

In the above, the invention has been explained with respect to the video signal Φ in general. It is noted, however, that the video signal comprises luminance and chrominance components. In principle, it is possible that the noise reduction parameter K is the same for such luminance and chrominance components. However, as an alternative, it may be that a noise reduction parameter $K_{LUM}$ for the luminance component of the video signal is processed separately from a noise reduction parameter $K_{CHR}$ for the chrominance component of the video signal, although the processing per se of each of such potentially different noise reduction parameters $K_{LUM}$ and $K_{CHR}$ will be identical to the processing described above.

It should be clear to a person skilled in the art that the scope of the present invention is not limited to the examples discussed in the above, but that several amendments and modifications are possible without departing from the scope of the invention as defined in the appending claims.

For instance, in the above, the invention is explained with reference to an example having a separate global motion detector 30 and a separate control unit 40, wherein the motion value calculator 37 forms part of the global motion detector 30. Alternatively, such motion value calculator 37 may form part of the control unit 40. Further, such separation is not essential, i.e., the control unit 40 and the global motion detector 30 may be implemented as an integrated whole.

In the above, the invention is explained with reference to an example where, first, a motion value μ is calculated while, secondly, Km is calculated on the basis of μ. However, it is also possible, in an embodiment where the control unit 40 and the global motion detector 30 are implemented as an integrated whole, that Km is calculated directly on the basis of the filtered difference signal ΦD, using a predetermined relationship between the filtered difference signal ΦD, on the one hand, and Km, on the other hand.

In a device having a motion vector detection unit, the motion detector may obtain the motion value μ in dependence upon the sum of all motion vector components.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A filter device comprising:
    a controllable temporal noise reduction unit having a first input for receiving a first video signal (Φ1), said controllable temporal noise reduction unit performing a noise reduction operation on said first video signal (Φ1) to provide a filter output signal (Φ3) at a filter output; and
    adjustment means for detecting a very low amount of motion in a video image of said first video signal (Φ1) and for controlling the controllable temporal noise reduction unit on the basis of the detected very low amount of motion, so as to enable the filter device to reduce cross-luminance and/or cross-color as well when only a very low amount of motion is present in the signal,
    wherein said adjustment means includes a motion detector having a first input for receiving said first video signal (Φ1), and a second input for receiving a second video signal (Φ2) representing a previous image, said motion detector comprising:
        a difference detector having inputs coupled to said two inputs of the motion detector, the difference detector producing a difference signal (ΦD) at an output thereof;
        a pre-filter coupled to the output of the difference detector for attenuating frequencies around a color subcarrier frequency of said first video signal (Φ1); and a motion value calculator coupled to an output of the pre-filter for calculating a motion value ($\mu$) in relationship to the filtered difference signal.

2. The filter device as claimed in claim 1, wherein said filter device further comprises a 2-D comb filter having an input for receiving an input video signal ($\Phi$) and an output for providing a filtered video signal as said first video signal ($\Phi 1$).

3. The filter device as claimed in claim 2, wherein the 2-D comb filter is implemented in hardware.

4. An image display apparatus comprising:
a filter device as claimed in claim 1 for generating a filter output signal ($\Phi 3$); and
a display device for displaying the filter output signal ($\Phi 3$).

5. A filter device comprising:
a controllable temporal noise reduction unit having a first input for receiving a first video signal ($\Phi 1$), said controllable temporal noise reduction unit performing a noise reduction operation on said first video signal ($\Phi 1$) to provide a filter output signal ($\Phi 3$) at a filter output; and
adjustment means for detecting a very low amount of motion in a video image of said first video signal ($\Phi 1$) and for controlling the controllable temporal noise reduction unit on the basis of the detected very low amount of motion, so as to enable the filter device to reduce cross-luminance and/or cross-color as well when only a very low amount of motion is present in the signal,
wherein said adjustment means comprises:
a motion detector for calculating a motion value ($\mu$) of the first video signal ($\Phi 1$); and
a control unit coupled to the motion detector for determining a filter parameter (K) for the controllable temporal noise reduction unit based partly on a predetermined noise reduction parameter Kd, and partly on a modification factor Km which is based on the motion value ($\mu$) calculated by the motion detector, said filter parameter (K) being determined according to the formula K=Kd+Km, where Km is a function of $\mu$, in that Km is zero for values of $\mu$ exceeding a low motion threshold $\mu_{TH}$.

6. The filter device as claimed in claim 5, wherein said low motion threshold $\mu_{TH}$ is about 5% of a maximum value of $\mu$.

7. The filter device as claimed in claim 5, wherein Km is a fixed non-zero value $\kappa$ for values of $\mu$ falling below the low motion threshold $\mu_{TH}$.

8. The filter device as claimed in claim 5, wherein Km is a fixed percentage of Kd for values of $\mu$ falling below the low motion threshold $\mu_{TH}$.

9. The filter device as claimed claim 5, wherein, if $\mu$ drops below said low motion threshold $\mu_{TH}$, the modification factor Km is made unequal to zero only after a predetermined waiting time.

10. The filter device as claimed claim 9, wherein said filter device further comprises a source detector for generating a source detection signal indicative of the source of the input video signal, and wherein said waiting time depends on the source detection signal.

11. A method for filtering a video signal comprising the steps of:
performing a controllable temporal noise reduction on a first video signal ($\Phi 1$) to provide a filter output signal ($\Phi 3$);
detecting a very low amount of motion in a video image of said first video signal ($\Phi 1$); and
controlling the controllable temporal noise reduction on the basis of the detected very low amount of motion, so as to enable a reduction of cross-luminance and/or cross-color as well when only a very low amount of motion is present in the signal, wherein said detecting and controlling steps comprise the steps of:
determining a difference between said first video signal ($\Phi 1$) and a second video signal ($\Phi 2$) representing a previous image;
pre-filtering said difference for attenuating frequencies around a color subcarrier frequency of said first video signal ($\Phi 1$); and
calculating a motion value ($\mu$) in relationship to the filtered difference.

* * * * *